(12) United States Patent
Kim et al.

(10) Patent No.: US 8,310,594 B2
(45) Date of Patent: Nov. 13, 2012

(54) METHOD AND SYSTEM FOR PICTURE-BASED USER INTERFACE FOR ADJUSTING PICTURE DISPLAY PARAMETER SETTINGS OF A DISPLAY DEVICE

(75) Inventors: Paul Suntae Kim, Mahwah, NJ (US); Sun Hong Ahn, Ladera Ranch, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 946 days.

(21) Appl. No.: 12/177,776

(22) Filed: Jul. 22, 2008

(65) Prior Publication Data

US 2010/0020238 A1    Jan. 28, 2010

(51) Int. Cl.
*H04N 5/445* (2006.01)
*H04N 5/66* (2006.01)
*H04N 9/12* (2006.01)

(52) U.S. Cl. ........................................ 348/564; 348/739
(58) Field of Classification Search .................. 348/564, 348/739, 581; 715/722, 726; 345/581
See application file for complete search history.

(56) References Cited

U.S. PATENT DOCUMENTS

| | | | |
|---|---|---|---|
| 5,327,228 A | 7/1994 | Satyanarayana et al. | |
| 6,324,695 B1 * | 11/2001 | Lee et al. ......................... | 725/38 |
| 6,791,624 B1 * | 9/2004 | Suga ............................... | 348/588 |
| 7,071,969 B1 * | 7/2006 | Stimson, III ............. | 348/207.11 |
| 7,268,829 B2 * | 9/2007 | Kim ............................... | 348/564 |
| 2002/0093518 A1 * | 7/2002 | Nakano ........................ | 345/643 |
| 2002/0163527 A1 * | 11/2002 | Park ................................ | 345/594 |
| 2003/0085926 A1 * | 5/2003 | Heynderickx et al. ........ | 345/765 |
| 2006/0282867 A1 * | 12/2006 | Mizuhashi et al. ........... | 725/105 |
| 2007/0206121 A1 * | 9/2007 | Yoshida ........................ | 348/630 |
| 2008/0043031 A1 * | 2/2008 | Jagmag ......................... | 345/581 |

OTHER PUBLICATIONS

"Samsung Support for LN-T4061F," Samsung User Manual for LN-T4061F TFT-LCD Television, Released Mar. 19, 2007, downloaded from http://www.samsung.com/us/support/detail/supportPrdDetail.do?menu=SP01&prd_ia_cd=02010100&prd_mdl_cd=LN-T4061FX/XAA&prd_mdl_name=LN-T4061F&prd_ia_sub_class_cd=P on May 19, 2010, p. 23, United States.

* cited by examiner

*Primary Examiner* — Scott Beliveau
*Assistant Examiner* — Alexander Q Huerta
(74) *Attorney, Agent, or Firm* — Beyer Law Group LLP

(57) ABSTRACT

A method and system for adjusting picture display settings of a display device is provided. One embodiment involves simultaneously displaying multiple pictures of the same visual content on the display device, wherein the picture setting and one or more sample pictures each at a different picture setting relative to the reference picture. Then user selection of a picture among the multiple pictures is received, and the current picture setting is adjusted to the settings of the selected picture. The process may be repeated.

16 Claims, 6 Drawing Sheets

METHOD AND SYSTEM FOR PICTURE-BASED USER INTERFACE FOR ADJUSTING PICTURE DISPLAY PARAMETER SETTINGS OF A DISPLAY DEVICE

FIELD OF THE INVENTION

The present invention relates generally to adjusting television picture settings, and in particular, user interface for adjusting television picture settings.

BACKGROUND OF THE INVENTION

The demand for digital televisions (DTV) is on the rise as many consumers are exposed to higher quality pictures. Such consumers are sensitive to the picture quality, though they have different preferences for picture characteristics. Conventional television sets typically provide adjustable picture settings that consumers may utilize to adjust picture display parameter settings (picture settings) such as contrast, brightness, sharpness, color, tint, etc. However, the visual effect of changing such picture settings (specially in combination) is generally not clearly understood by ordinary consumers. Furthermore, changing one setting may cause side effects to other related settings, resulting in a need in readjustment of the settings. Therefore, often consumers find it difficult and time consuming to properly adjust picture settings to their individual satisfaction.

BRIEF SUMMARY OF THE INVENTION

The present invention provides a method and system for a picture-based user interface for adjusting picture display parameter settings of a display device. One embodiment involves simultaneously displaying multiple pictures of the same visual content on the display device, at a current picture setting and one or more sample pictures each at a different picture setting relative to the reference picture. Then user selection of a picture among the multiple pictures is received, and the current picture setting is adjusted to the settings of the selected picture. The process may be repeated.

These and other features, aspects and advantages of the present invention will become understood with reference to the following description, appended claims and accompanying figures.

DETAILED DESCRIPTION OF THE INVENTION

The present invention provides a method and system for adjusting picture display parameter settings (picture settings or parameter settings) of an electronic display device. One embodiment involves a picture-based user interface for adjusting display device settings, wherein an adjustment system simultaneously displays multiple pictures (e.g., still image or moving video) of the same content (e.g., same scene) at different settings, on a display device. The system then allows a user to select a preferred picture among the displayed pictures. The parameter settings of the user selected picture represent currently preferred parameter settings for the display device. The system repeats the process as the user desires, until the user is satisfied with a final display setting selection as a current selection to be used for displaying the visual content on the display screen for the user.

Figure 1:
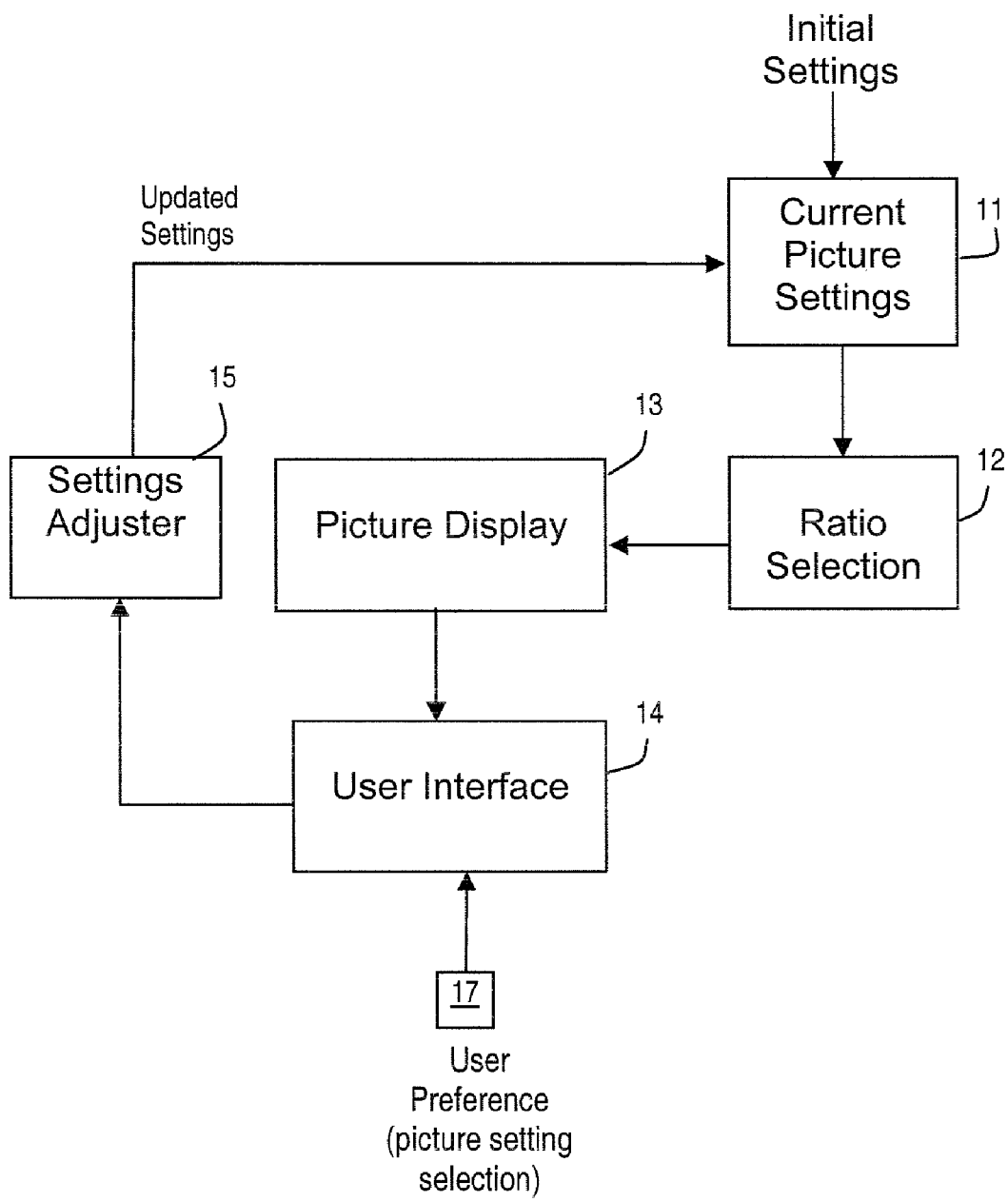
FIG. 1 shows a functional block of a system for adjusting picture display parameter settings of a display device, according to an embodiment of the invention.

FIG. 1 shows a functional block diagram of a system 10 implementing a picture-based user interface for adjusting television (TV) picture settings, according to an embodiment of the invention. The system 10 maintains a set of current picture settings 11 that starts from initial settings. A ratio selection module 12 then selects a set of settings for multiple pictures at different settings to be displayed to the user for selecting a preferred one indicating a preferred picture setting.

A picture display module 13 generates and displays the multiple pictures via a user interface module 14 (e.g., graphical user interface displayed on a TV screen which received user selections via a remote control 17). In one implementation, the multiple pictures include a reference picture and sample pictures at different settings based on the settings provided by the ratio selection module 12. According to the module 12, one or more picture settings (parameter values) are automatically determined (e.g., increased or decreased) in relation to the reference picture.

The reference picture, typically positioned in the center of the display screen, is generated based on current picture settings (e.g., contrast, brightness, sharpness, color, tint). The sample pictures, positioned around the reference picture, have different setting relative to the reference picture and relative to each other.

Utilizing the user interface 14, a user then selects a preferred picture (based on picture settings) among the displayed pictures. A settings adjuster 15 uses the picture settings of the selected picture for updating the current picture settings 11, with the selected picture becoming a new reference picture.

In a next iteration, if desired by the user, the sample pictures on the screen are then updated (by changing their settings differently, relative to the new reference picture), and the user can again select among the displayed pictures. This process continues until the user is satisfied with a final reference picture, the settings which are used for viewing usual content on the display in full-screen mode.

The picture setting process starts with a broad range of possible settings and narrows down to settings desired by the user, based on the repetitive selection process. Initially, the difference between settings of the pictures is relatively large (e.g., the granularity of settings is coarse). When the user makes a selection, the updated pictures have smaller relative setting differences (e.g., the granularity becomes finer). This process continues until setting differences between the pictures cannot be made smaller (e.g., granularity became the finest possible level given the hardware capabilities of the TV).

Figure 2:
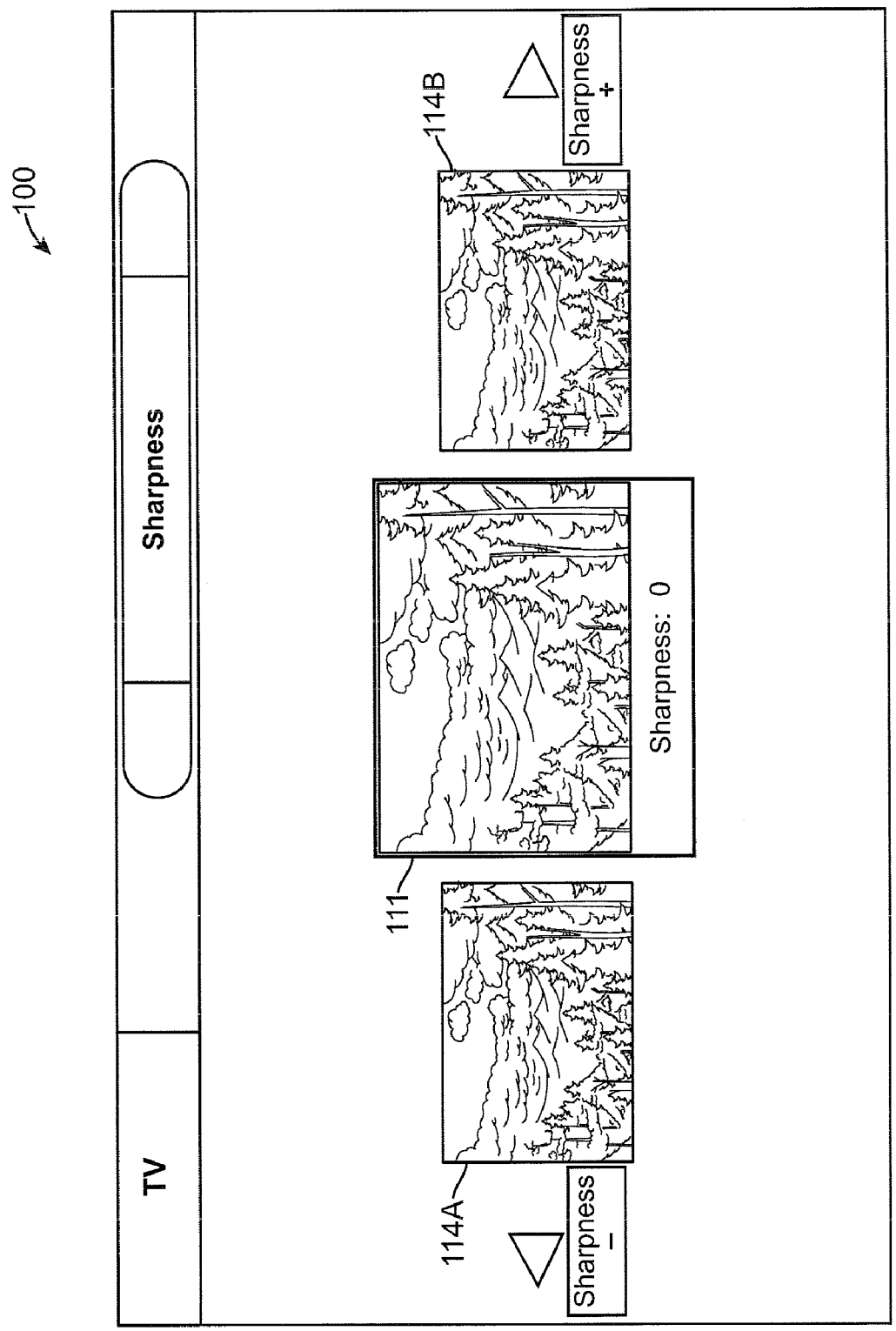
FIGS. 2-5 show example picture-based user interface menus for selecting among multiple displayed pictures at different picture quality single-parameter settings, according to the present invention.

The user may select desired picture settings via a picture-based menu showing the reference picture and multiple sample pictures, according to the invention. FIG. 2 shows an example picture-based menu 100 in which the user may change the "sharpness" parameter of the TV. A reference picture 111 is surrounded by two sample pictures 114A, 114B.

Initially, sample pictures have a large difference relative to the reference picture. The TV typically has a range of allowed values for a typical picture quality parameter. For example, the allowed range of sharpness parameter can be between −50 to 50. In one implementation, the reference picture is at the mid-point parameter (e.g., "sharpness") value of the relevant range of values. In another implementation, the sample pictures may be at a $1^{st}$ or $3^{rd}$ quarter position (whichever is closer to the reference picture), assuming that the desired setting is likely to be close to the current reference picture settings. Other examples are possible.

Figure 3:
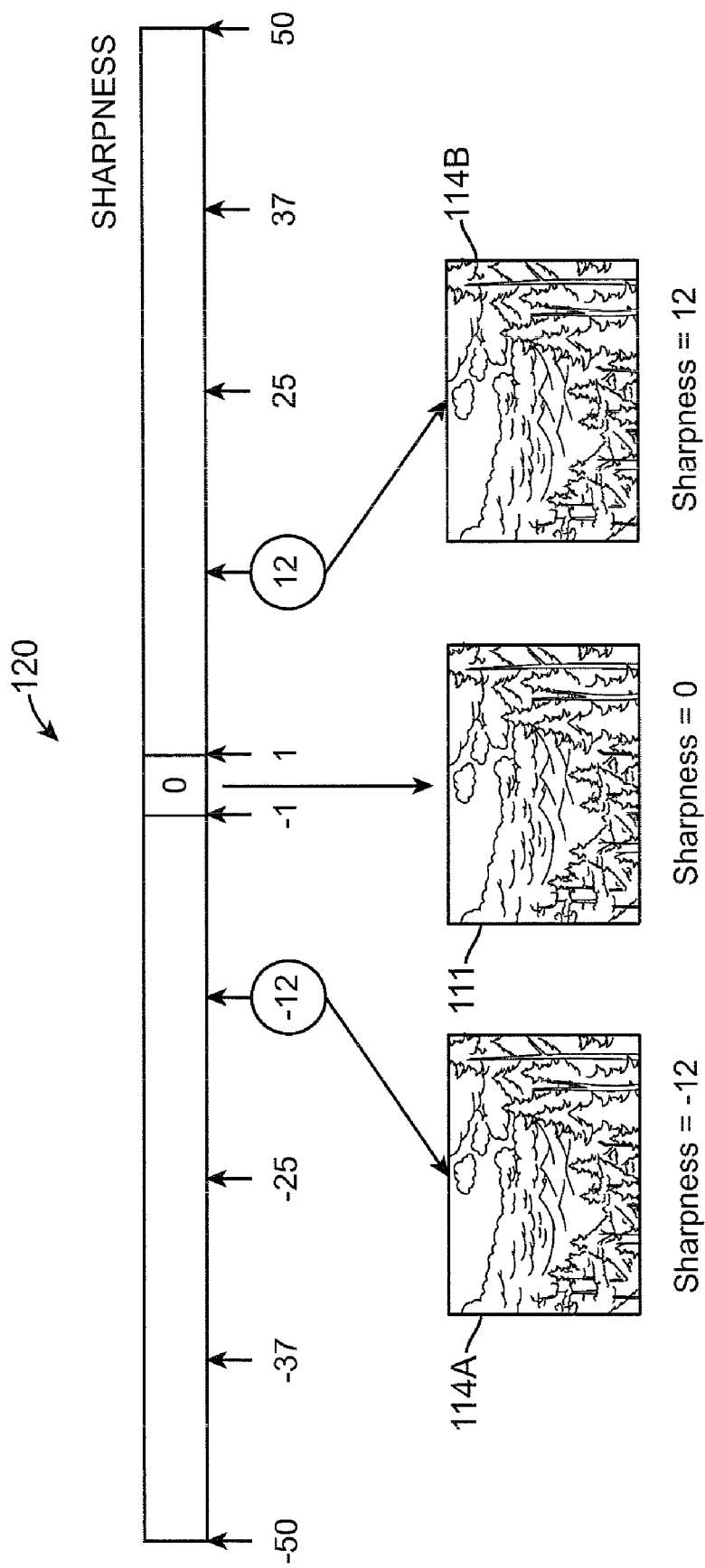

Referring to the example menu 120 in FIG. 3, the sample picture 114A on the left of the reference picture 111 represents a sharpness value within the range of −50 to −1, wherein for $3^{rd}$ quarter position ($3^{rd}$ quarter of −50 to −1), the value for the sample picture 111 would be −12. Similarly, the sample picture 114B on the right of the reference picture 111 represents a sharpness value within the range of +1 to +50, for $1^{st}$ quarter position ($1^{st}$ quarter of +1 to +50).

Figure 4:
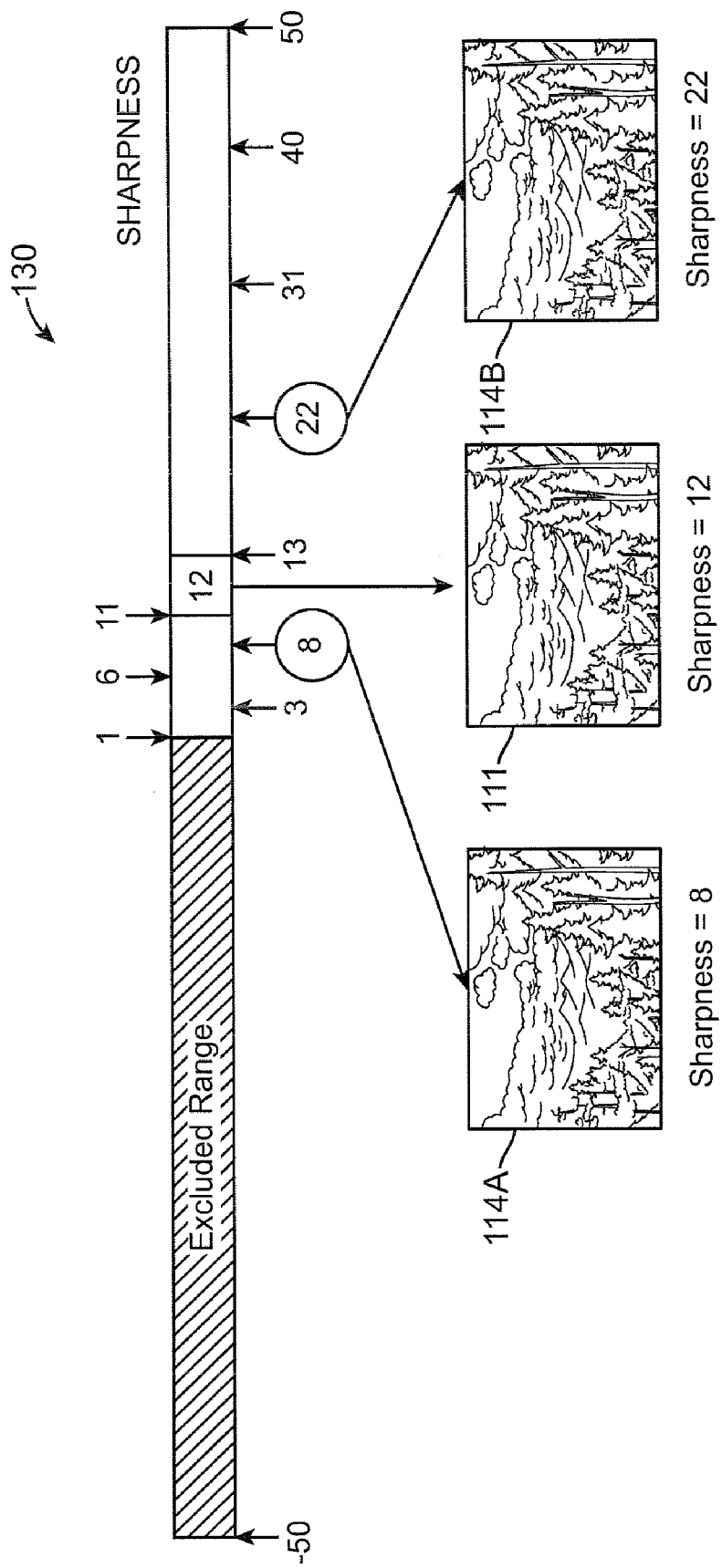

If the user selects the sample picture 114B as the best picture among the displayed pictures, the selected picture indicates the user prefers increased sharpness value relative to the current reference picture 111. As such, the selected (preferred) sharpness value for the user is a value between 1 and 50, excluding the range from −50 to 0. As shown by the example menu 130 in FIG. 4, the selected picture (i.e., picture 114B in FIG. 3) is then moved to the center of the menu 130 as the new reference picture 111. Further, a new picture with a sharpness value 8 ($3^{rd}$ quarter point of 1 to 11) is generated as the sample picture 114A, and a new picture with a sharpness value 22 ($1^{st}$ quarter value of 13 to 50) is generated as the sample picture 114B.

Figure 5:
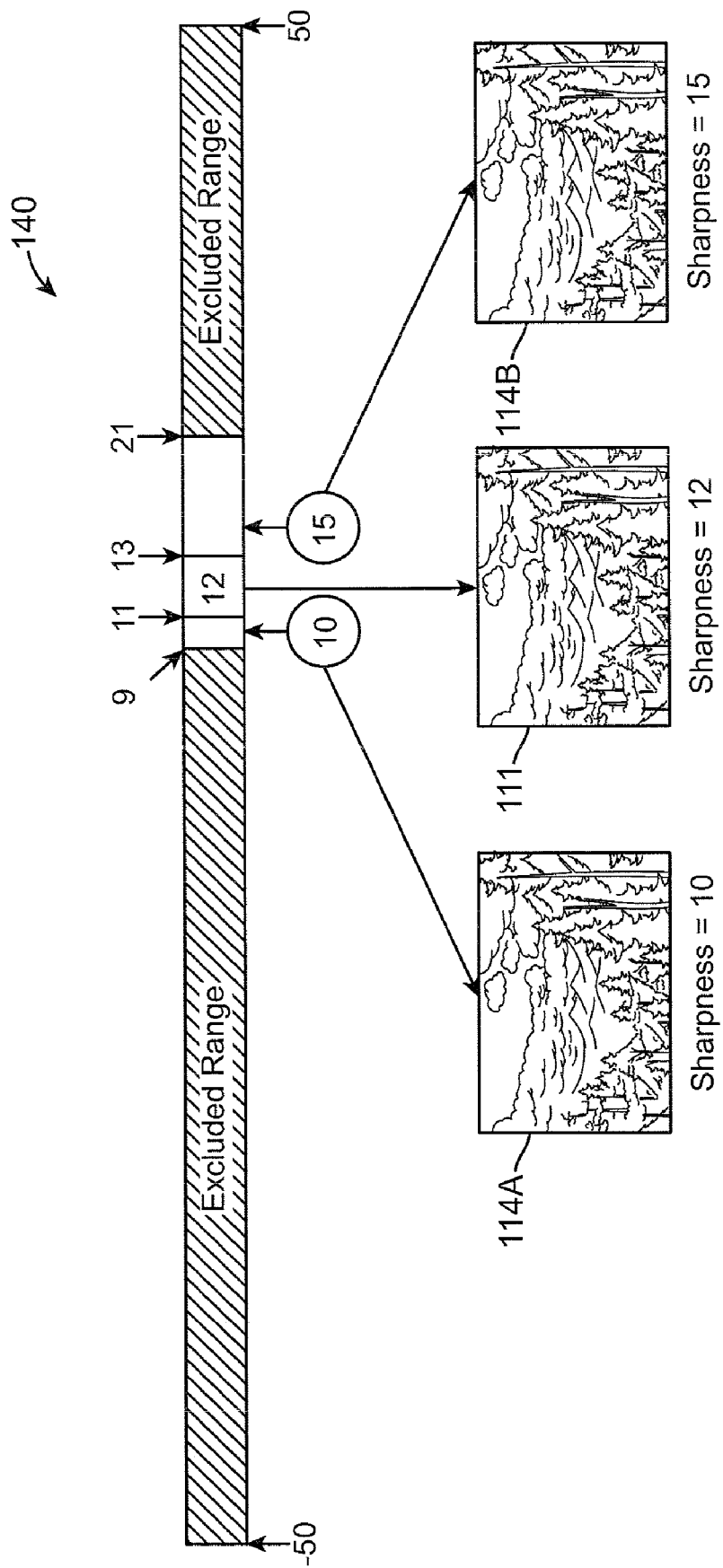

If on the menu 120 (FIG. 3), the user selects the current reference picture 111, that indicates that the preferred setting is within the sharpness range from the sample picture 114A to the sample picture 114B (excluding the sharpness values of the sample pictures 114A and 114B). As such, if on menu 120 the user selects the current reference picture 111, the preferable sharpness range becomes 9 to 21. This narrows down the effective range from 1-to-50 to 9-to-21, as shown by the example menu 140 in FIG. 5.

Selecting the current reference picture 111 on menu 120 (FIG. 3) will keep the reference picture but narrows down the range of values, and results in new sample pictures 114A, 114B (FIG. 5) based on the updated range of values. In this example, the new sample picture 114A (FIG. 5) is at sharpness value 10 ($3^{rd}$ quarter of 9 to 11) and the new sample picture 114B is at sharpness value 15 ($1^{st}$ quarter of 13 and 20). Using $1^{st}$ or $3^{rd}$ quarter values instead of mid-range values provides faster narrowing of options for the user preference when the preferred value resides close to the reference picture.

Further, the above process of display reference and sample pictures, and allowing user selection, continues until the range of values cannot be further narrowed down, in which case the final user selection is utilized as the desired setting value. The process can be applied to any of the settings (e.g., contrast, brightness, sharpness, color, tint).

From the user perspective, the process involves selecting best pictures among the displayed pictures. Each time the user makes a selection, the range of preferred value is quickly narrowed down and the number of total selections still remains small.

Further, more than two sample pictures (in addition to the reference picture) may be displayed at the same time for user selection. One example involves displaying two sample pictures on the left side of the reference picture and two sample pictures on the right side of the reference picture. The user then can select the best picture among the five displayed pictures.

Figure 6:
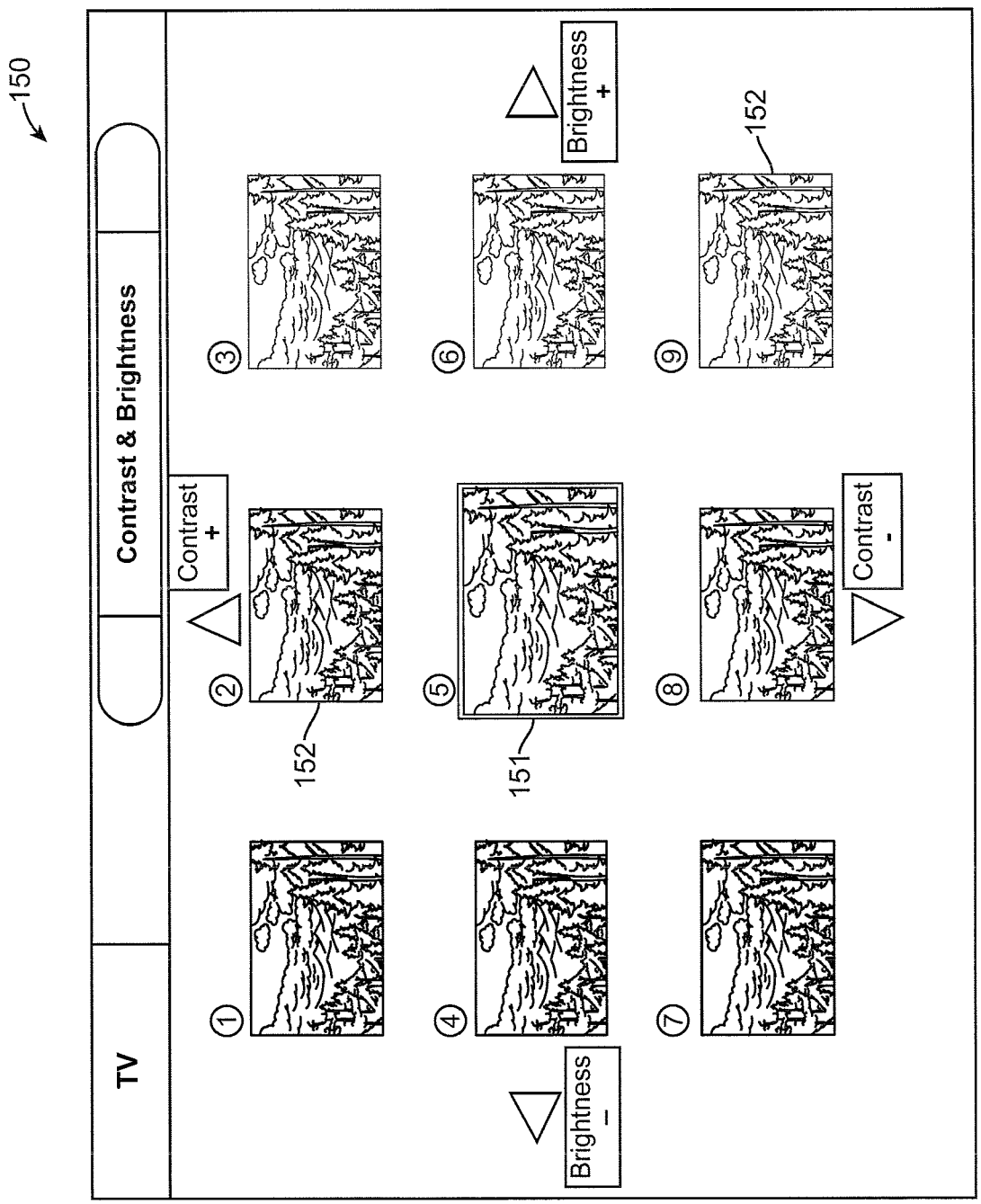
FIG. 6 shows an example picture-based user interface menu for selecting among multiple displayed pictures at different picture quality multiple-parameter settings, according to the present invention.

In order to handle two picture setting parameters (e.g., contrast and brightness) simultaneously, especially for those affecting each other, the system 10 displays a two-dimensional array of pictures as shown by example menu 150 in FIG. 6 (e.g., a central reference picture 151 and eight sample pictures 152). This provides a visual presentation of setting options in terms of the reference picture 151 and the sample pictures 152, which are updated in real-time based on user selection. Related settings such as {contrast, brightness}, {color, hue}, {color, tint}, etc., can be adjusted simultaneously. Selection of the best picture among the multiple displayed pictures is based on user input, as described above.

The two-dimensional example is especially useful in cases where changing value of one parameter affects optimal setting of another parameter. For example, viewers usually prefer different brightness parameter settings when contrast parameter is increased or decreased. A similar relationship exists for settings of color and tint. As such, conventionally a user first adjusted brightness settings to his best preference and then adjusted contrast, then needed to go back to adjust brightness to a new preferred value, which in turn affected contrast settings, and so on. This caused multiple manual rounds of picture settings for said parameters, which is not only inconvenient and time consuming, but also frequently resulted in sub-optimal adjustment of the parameter settings.

Unlike the conventional approach, the example two-dimensional array menu 150 according to the present invention represents combination of different parameter settings for related parameter pairs (e.g., {contrast, brightness}, {color, hue}, {color, tint}, etc.).

In the menu 150, the reference picture 151 (i.e., Picture ⑤) is surrounded by eight sample pictures 152 (i.e., Pictures ①, ②, ③, ④, ⑥, ⑦, ⑧, ⑨), of different contrast and/or brightness settings relative to the reference picture according to the ratio selection module 12 (FIG. 1). For example, the sample Picture ① has increased contrast but decreased brightness relative to Picture ⑤. Further, Picture ② has increased contrast and unchanged brightness relative to Picture ⑤. The display module 13 generates the nine pictures based on settings from the ratio selection module 12, and displays the nice pictures via the user interface 14. The user selects the best picture among the nine displayed pictures via the input device 17 for the user interface 14 (e.g., using number keys on a typical remote control, or an 8-way directional arrow buttons or joy stick, etc.).

Similar to the example described for single parameter setting in FIGS. 2-5, the user selected picture is moved to the center of the screen as the new reference picture. The sample pictures are updated based on the user selection. User selection and update of sample pictures continues in a similar way as the case of single parameter setting. Provided that the television hardware and software can handle multiple video plays, the sample pictures may comprise live video feed that the users are watching, at said different settings.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of adjusting picture display settings of a digital TV, comprising:

simultaneously displaying multiple pictures of the same visual content on a TV display, wherein the multiple pictures include a reference picture at a current picture setting and one or more sample pictures each at a different picture setting relative to the reference picture, wherein a first of the sample pictures has a first picture setting that is at a third quarter position of a first range of picture settings and a second of the sample pictures has a second picture setting that is at a first quarter position of a second range of picture settings;

receiving user selection of a picture among the multiple pictures;

determining whether a picture setting of the user selected picture is in the first range of picture settings or in the second range of picture settings;

if the selected picture is in the first range, excluding the second range of picture settings and generating a first new sample picture that is at a new third quarter position of a new first range which is from the closer end of the excluded second range to a position adjacent to the selected picture and a second new sample picture which is from a position adjacent to the selected picture to the end of the first range;

if the selected picture is in the second range, excluding the first range of picture settings and generating a third new sample picture that is at a new third quarter position of a new second range which is from the closer end of the excluded first range to a position adjacent to the selected picture and a fourth new sample picture which is from a position adjacent to the selected picture to the end of the second range; and setting the selected picture as a new reference picture.

2. The method of claim 1 further including repeating the steps of simultaneously displaying multiple pictures, receiving user selection and adjusting the current picture setting, wherein said repeating continues until the difference in the picture settings cannot be made smaller given hardware capabilities of the digital TV.

3. The method of claim 1 further comprising generating multiple pictures at different picture quality parameter settings, such that each picture setting is at a different ratio within a picture quality parameter range relative to other pictures, wherein simultaneously displaying multiple pictures includes simultaneously displaying the multiple pictures generated at different picture quality parameter settings.

4. The method of claim 3 further including repeating the steps of generating multiple pictures at different picture quality parameter settings, simultaneously displaying multiple pictures, receiving user selection and adjusting the current picture setting.

5. The method of claim 4 further comprising narrowing the picture quality parameter range in each repetition.

6. The method of claim 1 further comprising generating multiple pictures at different picture quality parameter settings, such that at least one picture setting is at a different radio within a pair of picture quality parameter ranges relative to other pictures, wherein simultaneously displaying multiple pictures includes simultaneously displaying the multiple pictures.

7. The method of claim 6, wherein the multiple pictures are displayed on the TV display as a two-dimensional array, each dimension representing one of said quality parameter ranges.

8. The method of claim 1, wherein simultaneously displaying multiple pictures includes simultaneously displaying multiple moving videos of the same visual content on the TV display.

9. The method as recited in claim 1 wherein the first range of picture settings are settings that are less than the current picture setting.

10. The method as recited in claim 1 wherein the second range of picture settings are settings that are greater than the current picture setting.

11. A digital TV, comprising:

a picture display module configured to simultaneously display multiple pictures of the same visual content on a TV display, wherein the multiple pictures include a reference picture at a current picture setting and one or more sample pictures each at a different picture setting relative to the reference picture, wherein a first of the sample pictures has a first picture setting that is at a third quarter position of a first range of picture settings and a second of the sample pictures has a second picture setting that is at a first quarter position of a second range of picture settings;

a user interface module configured to receive user selection of a picture among the multiple pictures;

a ratio selection module configured to determine whether a picture setting of the user selected picture is in the first range of picture settings or in the second range of picture settings, wherein if the selected picture is in the first range, the ratio selection module excludes the second range of picture settings and generates a first new sample picture that is at a new third quarter position of a new first range which is from the closer end of the excluded second range to a position adjacent to the selected picture and a second new sample picture which is from a position adjacent to the selected picture to the end of the first range, and wherein if the selected picture is in the second range, the ratio selection module excludes the first range of picture settings and generates a third new sample picture that is at a new third quarter position of a new second range which is from the closer end of the excluded first range to a position adjacent to the selected picture and a fourth new sample picture which is from a position adjacent to the selected picture to the end of the second range; and a settings adjuster module configured to set the selected picture as a new reference picture.

12. The digital TV of claim 11 wherein the ratio selection module is further configured to determine different picture quality parameter settings, such that each picture setting is at a different ratio within a picture quality parameter range relative to other pictures, and wherein the picture display module is further configured to generate multiple pictures at said different picture quality parameter settings, and simultaneously display the multiple pictures.

13. The digital TV of claim 12, wherein the ratio selection module is further configured to narrow the picture quality parameter range for each repetition of displaying multiple pictures and user selection of a picture.

14. The digital TV of claim 11 wherein the ratio selection module is further configured to determine different picture quality parameter settings, such that at least one picture setting is at a different ratio within a pair of picture quality parameter ranges relative to other pictures, and wherein the picture display module is further configured to generate multiple pictures at said different picture quality parameter settings, and simultaneously display the multiple pictures.

15. The digital TV of claim 14, wherein the multiple pictures are displayed on the TV display as a two-dimensional array, each dimension representing one of said quality parameter ranges.

16. The digital TV of claim 11, wherein the multiple pictures include moving videos of the same visual content.

* * * * *